United States Patent
Sassi

[11] 4,010,513
[45] Mar. 8, 1977

[54] WIPER DEVICE FOR ARCUATE AND FLAT SURFACES

[76] Inventor: Ralph Sassi, 168 Ardmore, Des Plaines, Ill. 60016

[22] Filed: June 9, 1975

[21] Appl. No.: 585,253

[52] U.S. Cl. .............................. 15/245; 15/143 R; 15/236 R; 15/250.36; D8/97; D8/107
[51] Int. Cl.² ........................................... A47L 1/06
[58] Field of Search ............ 15/245, 250.36, 104 S, 15/143 R, 236; D7/151, 152, 106; D8/97, 98, 101, 107

[56] References Cited
UNITED STATES PATENTS

| | | | |
|---|---|---|---|
| 1,934,556 | 11/1933 | Pelz | 15/245 |
| 3,051,975 | 9/1962 | Schwartz | 15/245 X |
| 3,119,138 | 1/1964 | Davis | 15/104 S |
| 3,413,675 | 12/1968 | Westrum | 15/245 |
| 3,649,987 | 3/1972 | Tomingas et al. | 15/245 |
| 3,676,888 | 7/1972 | Akers | 15/245 |
| 3,717,898 | 2/1973 | Jones | 15/245 |
| D30,404 | 3/1899 | Booker | 15/236 R X |

FOREIGN PATENTS OR APPLICATIONS 562,430   6/1944   United Kingdom ............ 15/143 R

*Primary Examiner*—Peter Feldman
*Attorney, Agent, or Firm*—Leydig, Voit, Osann, Mayer & Holt, Ltd.

[57] ABSTRACT

A wiper device for removing moisture from both flat and arcuate surfaces, such as the washed exterior surfaces of automobiles. The wiper device includes a handle and blade support, which have a unitary lightweight plastic construction, and an elongated flexible wiper blade secured to the support along one of its sides. The wiper blade is made of a relatively soft rubber stock material and extends out from the support a sufficient distance to enable the blade to conform closely to both flat and curved surfaces over which it is passed to facilitate the substantially complete removal of moisture from such surfaces.

7 Claims, 6 Drawing Figures

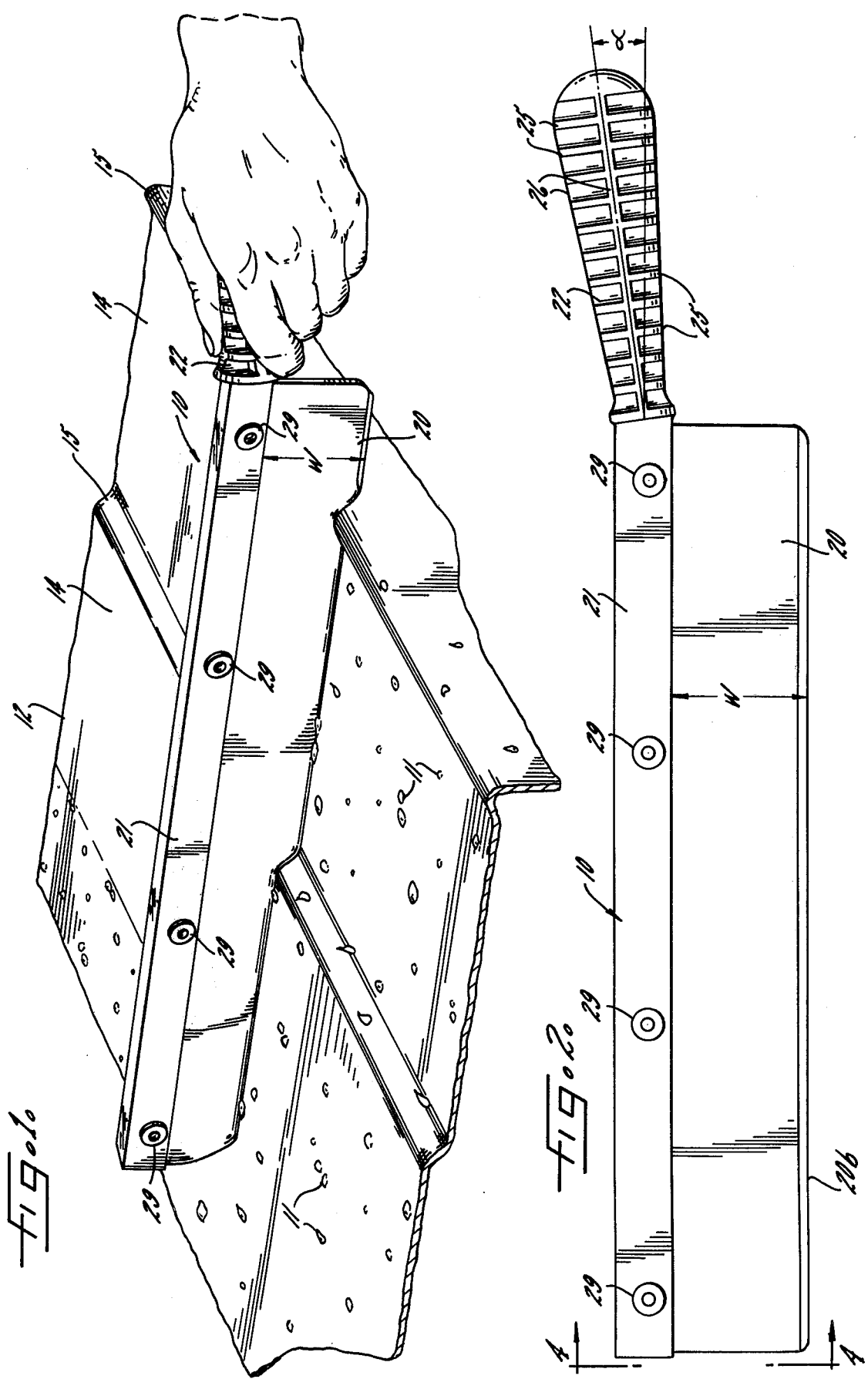

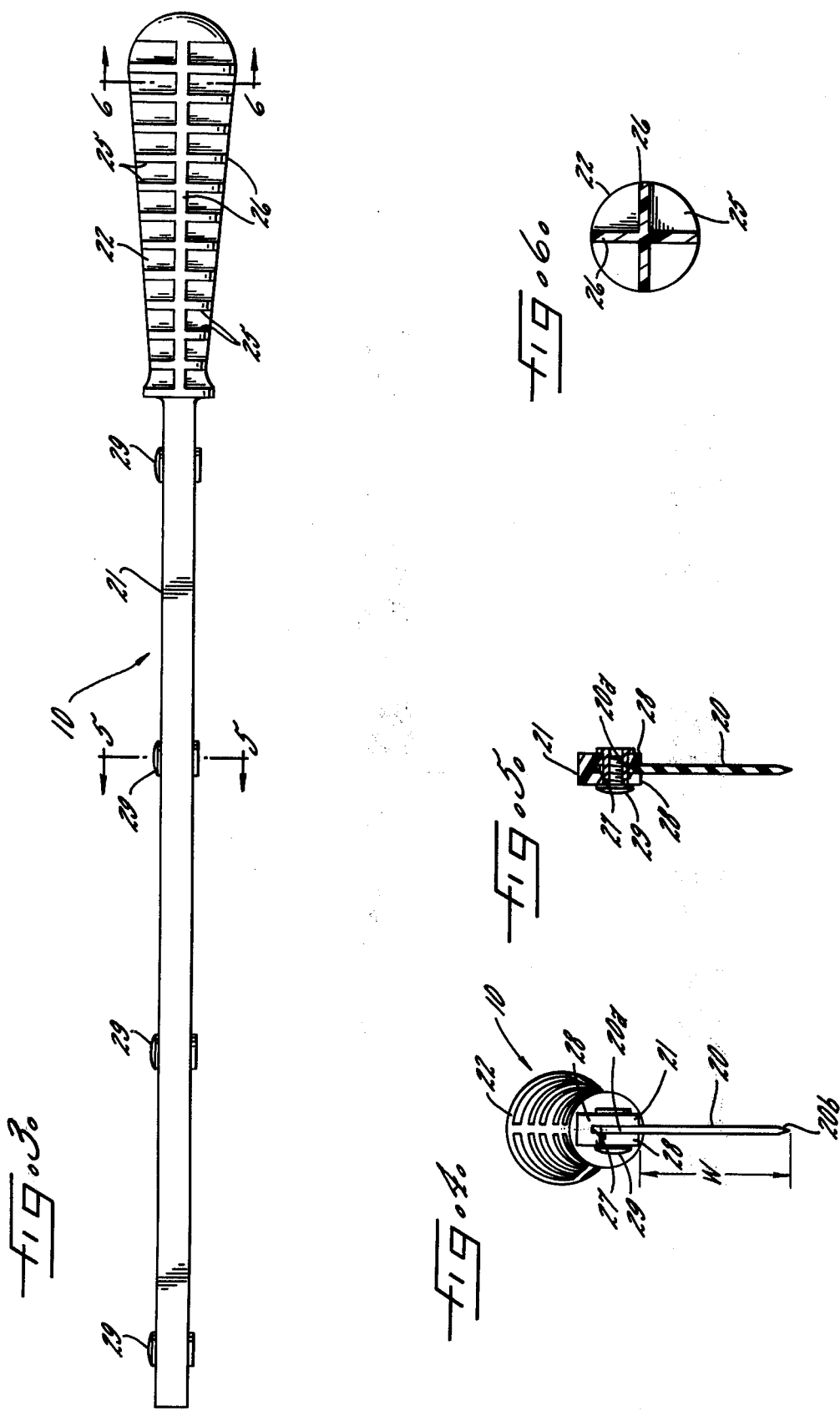

WIPER DEVICE FOR ARCUATE AND FLAT SURFACES

DESCRIPTION OF THE INVENTION

The present invention relates to wiper devices and more particularly to a wiper device for removing moisture from both flat and arcuate surfaces, such as the exterior body surfaces of automobiles after having been washed.

Notwithstanding the development of automatic carwashes, many automobile owners prefer to personally hand wash their cars since they believe they can do a more thorough job with less harm to the car. After washing and rinsing by hand, it is common practice to use a chamois cloth to remove remaining water so as to permit the surface to dry without spotting. However, such chamois cloths generally become quickly saturated in only one or two wipes across the hood and must be continually wrung out. Even after such chamoising, it is still generally necessary to use a towel or cloth to remove the remaining moisture. Moreover, in recent years chamoises have become a relatively expensive item.

While various types of wiper and squeegee devices have been available, such devices have not been used for wiping automobiles after washing because they generally have an elongated configuration and cannot effectively wipe the many curved areas of the automobile. Many present wiper devices also would tend to scratch or mar the exterior of the car if extreme care were not taken.

It is an object of the present invention to provide an inexpensive wiper device that is adapted to permit quick and relatively complete removal of moisture from both flat and curved surfaces.

Another object is to provide a wiper device as characterized above that has a lightweight easy to handle construction so that it may be held in an outstretched arm to reach even remote areas of the car without tiring the user.

A further object is to provide a wiper device of the above kind that can be conveniently used on automobile exteriors without marring or scratching the painted surfaces.

Still another object is to provide a wiper device of the foregoing type that is of a relatively simple, inexpensive construction, and thus is economical to manufacture.

Other objects and advantages of the invention will become apparent upon reading the following detailed description and upon reference to the drawings, in which:

FIG. 1 is a perspective of a wiper device embodying the present invention being used to clear moisture from the outer surface of an automobile fender;

FIG. 2 is a side elevational view of the wiper device shown in FIG. 1;

FIG. 3 is a top view of the wiper device shown in FIG. 2;

FIG. 4 is an end view of the illustrated wiper device taken in the plane of line 4—4 in FIG. 2; and FIGS. 5 and 6 are sections taken in the planes of lines 5—5 and 6—6, respectively, in FIG. 3.

While the invention is susceptible of various modifications and alternative constructions, a certain illustrative embodiment thereof has been shown by way of example in the drawings and will be described herein. It should be understood, however, that it is not intended to limit the invention to the specific form disclosed, but, on the contrary, the intention is to cover all modifications, alternative constructions, equivalents and uses falling within the spirit and scope of the invention.

Referring more particularly to FIG. 1 of the drawings, there is shown an illustrative wiper device 10 embodying the present invention being used to clear moisture 11 from an automobile fender 12 which has both flat and curved surfaces, 14, 15, respectively. The automobile previously has been washed and rinsed by hand and the wiper device 10 is being used to clear the remaining moisture from the fender to prevent spotting.

The wiper device 10 includes an elongated flexible wiper blade 20 secured along one of its long sides 20a to a support member 21. For holding the device 10, the blade support member 21 has a handle 22 at one end in substantial alignment therewith. The support member 21 and handle 22 preferably are made of a plastic material and have a unitary or one piece construction. The illustrated handle 22 comprises a plurality of axially spaced radial ribs 25 interconnected by a pair of mutually perpendicular longitudinally extending ribs 26. The radial and longitudinal ribs 25, 26 both are proportioned so that the end of the handle 22 becomes progressively larger to facilitate comfortable and secure holding of the device. The ribbed construction further provides a relatively rigid and lightweight handle structure.

In accordance with one aspect of the invention, the handle 22 makes a relatively small angle $\alpha$ with the longitudinal axis of the blade support member 21 so that the outermost end of the handle is set back from the support axis on a side opposite from that which the wiper blade 20 extends. The handle 22 preferably is offset at an angle $\alpha$ of about 5° to 10°. Such offsetting of the handle enables the user to hold the device 10 with his hand away from the surface being cleared.

For securing the wiper blade 20 to the support member 21, the support member 21 in this case is formed with a channel shaped cross section defining a groove 27 and a pair of spaced parallel legs 28. The elongated side 20a of the wiper blade 20 is positioned within the channel groove 27 between the legs 28 and is fixed therein by a plurality of rivets 29 extending transversely through the legs 28 and the wiper blade side.

In accordance with a primary feature of the invention, the wiper blade has a width and resiliency sufficient to permit the outer elongated edge thereof to conform closely to the curved surface over which it is passed and cause the removal of substantially all of the moisture from the surface. To this end, the wiper blade 20 extends from the support member 21 a width W of at least 1¼ inches and is made of a soft rubber stock having a durometer hardness rating of between 30 and 40. The wiper blade also should be sufficiently long, preferably at least 12 inches, to permit wide areas of the surface to be wiped on each stroke. For substantially longer lengths of blade, it generally is desirable to also increase the width W. Preferably, the width W should be about 1/10 of the length. In practice, it has been found that the advantages of the invention are achieved by a wiper blade made of ⅛ inch pure gum rubber stock having the durometer hardness rating of 35, a length of 12 inches, and a width W of 1¼ inches.

In keeping with the invention, the outer elongated side of the wiper blade 20 has a V-shaped cross-section that defines a sharp clearing edge 20b. Such a sharp clearing edge 20b tends to maintain close pointed contact with the surface to enable more complete removal of the moisture as the blade passes over the surface. As shown in FIG. 1, due to the relatively soft, flexible nature of the wiper blade 20, the clearing edge 20b maintains close contact even with the curved areas 15.

From the foregoing, it can be seen that the wiper device 10 of the present invention is adapted to effectively clear moisture from both curved and flat surfaces. Because of the length of the blade, relatively large areas may be covered on each stroke of the device, enabling an entire automobile to be cleared in only a few minutes. Since the wide width W and resiliency of the blade permit it to conform closely with all surfaces over which it is passed, the blade removes the major portion of moisture from the surfaces to permit spotless drying, often even without subsequent toweling.

It will be further understood that the wiper device has a relatively simple construction that is susceptible to economical manufacture. For example, the unitary support member and handle may be economically formed through plastic ejection molding processes. Since the resulting wiper has a lightweight plastic construction it may be easily held in an outstretched arm to reach remote areas without tiring the user. Furthermore, even if the plastic support member should strike the car during such use, it will not scratch or mar the painted surface.

While the illustrated wiper device has been described specifically in connection with the washing and cleaning of automobiles, it will be understood that it may be used for various other purposes, such as the clearing of counter tops, table tops, windows, and the like.

I claim as my invention:

1. A wiper apparatus for clearing moisture from both curved and flat surfaces comprising an elongated support member, a handle extending outwardly from an end of said support member, said handle and support member being formed of a unitary plastic piece, a relatively soft rubber elongated wiper blade having a thickness of about ⅛ inch, said support being formed with a channel-shaped cross-section including a pair of spaced parallel legs, means securing one elongated side of said wiper blade in said support member channel such that said wiper blade extends outwardly from said support member with the outer elongated side thereof defining a clearing edge, said wiper blade having a length of at least 12 inches and extends outwardly from said support member a distance of at least 1/10 of its length and has a durometer hardness rating of between 30 and 40 so that the clearing edge thereof can conform closely to both curved and flat surfaces over which it is passed for clearing substantially all moisture thereon, and said handle makes an angle of between 5° and 10° with respect to the longitudinal axis of said support member so that the outermost end of said handle is set back from the support axis on a side opposite that from which said wiper blade extends.

2. The wiper apparatus of claim 1 in which said wiper blade has a durometer hardness rating of about 35.

3. The wiper apparatus of claim 1 in which the outer elongated side of said wiper blade has a generally V-shaped cross-section defining a sharp clearing edge.

4. The wiper apparatus of claim 1 in which said handle comprises a plurality of spaced flat ribs interconnected by at least one longitudinally extending rib.

5. The wiper apparatus of claim 4 in which said spaced ribs are interconnected by a pair of mutually perpendicular longitudinally extending ribs.

6. The wiper apparatus of claim 5 in which said blade securing means includes a plurality of rivets extending through said channel legs and the side of the wiper blade held therein.

7. The wiper apparatus of claim 3 in which said wiper blade is made of a pure gum rubber stock.

* * * * *